(12) United States Patent
Diallo et al.

(10) Patent No.: US 9,021,504 B2
(45) Date of Patent: Apr. 28, 2015

(54) METHOD AND DEVICE FOR AUTOMATICALLY SELECTING AN APPLICATION THAT CAN BE IMPLEMENTED BY SAID DEVICE

(75) Inventors: Sophie Diallo, Ivry sur Seine (FR); Jimmy de Brito, Saint Thibault des Vignes (FR); Franck Bricout, Vaux le Penil (FR)

(73) Assignee: Oberthur Technologies, Levallois-Perret (FR)

( * ) Notice: Subject to any disclaimer, the term of this patent is extended or adjusted under 35 U.S.C. 154(b) by 813 days.

(21) Appl. No.: 12/749,050

(22) Filed: Mar. 29, 2010

(65) Prior Publication Data
US 2010/0251261 A1 Sep. 30, 2010

(30) Foreign Application Priority Data
Mar. 27, 2009 (FR) .................................. 09 01484

(51) Int. Cl.
*G06F 3/00* (2006.01)
*G07F 7/08* (2006.01)
*G06F 9/54* (2006.01)
*G06Q 20/34* (2012.01)

(52) U.S. Cl.
CPC .............. *G07F 7/0866* (2013.01); *G06F 9/542* (2013.01); *G06Q 20/341* (2013.01); *G06Q 20/352* (2013.01); *G06Q 20/3574* (2013.01)

(58) Field of Classification Search
CPC ........................................................ G06F 9/542

USPC .......................................................... 719/310
See application file for complete search history.

(56) References Cited

U.S. PATENT DOCUMENTS

| | | | |
|---|---|---|---|
| 6,185,735 B1 * | 2/2001 | Le Berre ........................... | 725/5 |
| 6,564,995 B1 * | 5/2003 | Montgomery ................. | 235/379 |
| 6,631,849 B2 * | 10/2003 | Blossom ........................ | 235/492 |
| 7,516,444 B2 * | 4/2009 | Perlin et al. ................... | 717/125 |
| 2007/0293155 A1 | 12/2007 | Liao et al. | |
| 2008/0129450 A1 | 6/2008 | Riegebauer | |
| 2008/0152874 A1 * | 6/2008 | Philips ....................... | 428/195.1 |
| 2008/0306849 A1 * | 12/2008 | Johnson et al. ................. | 705/35 |

OTHER PUBLICATIONS

Qing Xu, Design and Analysis of Highway Safety Communication Protocal in 5.9 GHz Dedicated Short Range Communcation Spectrum,, 2003.*
NXP: "MF1ICS50 Functional Specification", Internet Citation, nxp.com/acrobat_download/other/identification/M001053_MF1ICS50_rev5_3.pdf pp. 1-19, Feb. 13, 2009.

* cited by examiner

*Primary Examiner* — Lechi Truong
(74) *Attorney, Agent, or Firm* — Cozen O'Connor

(57) ABSTRACT

An electronic device includes means for receiving messages transmitted by an external entity; and means for implementing at least two applications communicating with the external entity using the same protocol. A generator means is suitable for generating a predetermined event on receiving at least one particular message received from the entity or in the event of communication being initialized with the entity. A selection means is suitable for detecting the event and for selecting one application amongst the applications. The selected application is chosen independently of any message received from the external entity.

18 Claims, 5 Drawing Sheets

METHOD AND DEVICE FOR AUTOMATICALLY SELECTING AN APPLICATION THAT CAN BE IMPLEMENTED BY SAID DEVICE

BACKGROUND OF THE INVENTION

The present invention lies in the field of multi-application electronic devices suitable for communicating with an external entity, said devices preferably being portable.

The invention applies particularly, but in non-limiting manner, to microcircuit cards (smart cards) suitable for communicating with a smart card reader, to implement one or more applications (a payment transaction, controlling access, . . . ).

Document US 2008/0306849 describes a method capable of being implemented by a reader for communicating with a smart card suitable for implementing applications complying with the ISO 14443-4 protocol, and applications complying with the MIFARE protocol. In that method, it is necessary for the reader to take cognizance of the applications supported by the smart card in order to be able to select them.

The invention serves to avoid that constraint.

OBJECT AND SUMMARY OF THE INVENTION

In a first aspect, the invention provides an electronic device comprising:
  means for receiving messages transmitted by an external entity;
  means for implementing at least two applications communicating with said external entity using the same protocol;
  generator means suitable for generating a predetermined event on receiving at least one particular message received from said entity or in the event of communication being initialized with said entity; and
  selection means suitable for detecting said event and for selecting one application amongst said applications, the selected application being chosen independently of any message received from said external entity.

In corresponding manner, the invention also provides a selection method that can be implemented by an electronic device suitable for communicating with an external entity and for implementing at least two applications communicating with said external entity using the same protocol, the method comprising:
  a step of generating a predetermined event on reception of at least one particular message received from said entity or in the event of communication being initialized with said entity;
  a step of detecting said event; and
  a step of selecting one application amongst said applications, the selected application being chosen independently of any message received from said external entity.

Thus, in very advantageous manner, the invention makes it possible to select an application implemented by the electronic device without the external unit emitting any command for selecting the application.

In a particular embodiment, the electronic device of the invention:
  includes means for executing a first computer module suitable for launching the execution of a second computer module, the second module being suitable for implementing the said applications; and
  the event generation means are implemented by the first module.

A preferred, but non-limiting, application of the invention occurs when the second computer module that implements the above-mentioned applications appears in the form of a "black box" to the electronic device.

This applies in general when the second computer module has been developed by a third party.

In this document, the concept of a "computer module" should be understood broadly: it covers in particular a computer program, a computer subprogram, a function, or a library of functions.

In a particular embodiment of the invention:
  the first module is suitable for communicating with the external entity in application of ISO 14443-1 to ISO 14443-3 standards;
  said applications are MIFARE (registered trademark) applications; and
  the second module is suitable for implementing an application to generate the sending and receiving of messages exchanged with the external entity in the context of the MIFARE applications.

It is recalled that MIFARE technology relies on the ISO 14443 type A standard and differs therefrom in that it replaces the ISO 14443-4 layer with the proprietary MIFARE protocol, with the "ISO 14443 type A" and MIFARE technologies sharing in common the ISO 14443-1, ISO 14443-2, and ISO 14443-3 protocols.

For further information about MIFARE technology, the person skilled in the art may refer to the document "MF1ICS50, functional specification, Rev. 5.3" of Jan. 29, 2008.

In known manner, the messages sent by a reader (or more generally by an external entity) to a smart card (or more generally to a portable electronic device) in the context of a MIFARE application consists essentially in control messages for obtaining read or write access to a memory that is dedicated to the MIFARE application.

In this particular field, it is common practice to use the term "MIFARE application" to designate the memory itself. Consequently, it is necessary to distinguish between:
  the MIFARE application, i.e. the memory; and
  the application that generates the messages exchanged with the reader in order to access the memory for reading or writing.

Consequently, in a particular implementation, the invention makes it possible to select a MIFARE application implemented, e.g. by a smart card, in order to carry out a transaction with a reader of said card, without said reader emitting any command to select the MIFARE application or the memory dedicated thereto.

In an embodiment of the invention, the first module generates the predetermined event on receiving a command that is interpretable by the first module.

When the first module is suitable for communicating with the external entity in application of the ISO 14443-1 to ISO 14443-3 standards, the particular message generating the predetermined event in the meaning of the invention may be selected in particular from:
  the REQA polling message emitted periodically by the reader;
  the SEL message for selecting a card (an electronic device in the meaning of the invention); or
  the HALT message for ending a transaction, as defined by the ISO 14443-3 standard.

This embodiment makes it possible advantageously to select a MIFARE application after the end of a first MIFARE transaction, and regardless of the way in which the first MIFARE application terminates, for example as a result of the reader sending a HALT message or as a result of the electromagnetic field being interrupted.

Under certain circumstances, it is possible that the external entity emits certain messages several times over, e.g. several polling messages.

The person skilled in the art will understand that under such circumstances it can happen that certain applications are never selected.

The invention proposes two solutions for avoiding that problem:
either generating the predetermined event immediately before launching execution of the second module; or
else generating the predetermined event on receiving a command that is not interpretable by the first module.

In one particular embodiment, the first module resumes execution after execution of the second module, and the first module generates the predetermined event after the resumption of execution.

It is fundamental to note clearly that, in accordance with the invention, application selection, i.e. choosing one application from amongst the possible applications, takes place independently of any message being received from the reader.

In a particular embodiment, the selection means of the device of the invention select the applications one after another in sequential manner.

In a variant, the applications may be selected cyclically, or randomly.

In a particular embodiment, the various steps of the selection method are determined by computer program instructions.

Consequently, the invention also provides a computer program on a data medium, the program being suitable for being implemented in a communicating electronic device or more generally in a computer, the program including instructions suitable for implementing steps of a selection method as described above.

The program may use any programming language, and it may be in the form of source code, object code, or code intermediate between source code and object code, such as in a partially-compiled form, or in any other desirable form.

The invention also provides a data medium readable by a computer and including instructions of a computer program as mentioned above.

The data medium may be any entity or device capable of storing the program. For example, the medium may comprise storage means such as a read-only memory (ROM), e.g. a compact disk (CD) ROM or a microelectronic circuit ROM, or indeed magnetic recording means, e.g. a floppy disk or a hard disk.

Furthermore, the data medium may be a transmissible medium such as an electrical or optical signal, which may be conveyed via an electrical or optical cable, wirelessly, or by other means. The program of the invention may in particular be downloaded from a network of the Internet type.

Alternatively, the data medium may be an integrated circuit in which the program is incorporated, the circuit being adapted to execute, or to be used in the execution of, the method in question.

In the first variant embodiment of the above-mentioned invention, the electronic device takes the decision to select an application on being triggered by the occurrence of an event associated with the reception of a particular message received from the reader.

In a second aspect, the invention also provides an electronic device including:
means for implementing at least two MIFARE applications; and
means for systematically selecting one of said MIFARE applications after one of said MIFARE applications has been executed.

Correspondingly, the invention provides a selection method that can be implemented by an electronic device suitable for implementing at least two MIFARE applications, the method always selecting one of the MIFARE applications after executing one of said MIFARE applications.

A MIFARE application may also be selected sequentially, cyclically, or randomly.

In a particular embodiment of this second variant, the electronic device of the invention includes means for executing a first computer module suitable for launching the execution of a second computer module, the second module being suitable for implementing the MIFARE applications, the selection means being implemented by the first module.

In a particular embodiment, the first module selects the MIFARE application immediately prior to launching execution of the second module.

BRIEF DESCRIPTION OF THE DRAWINGS

Other characteristics and advantages of the present invention appear from the following description given with reference to the accompanying drawings that show an embodiment having no limiting character. In the figures.

DETAILED DESCRIPTION OF AN EMBODIMENT

Figure 1:
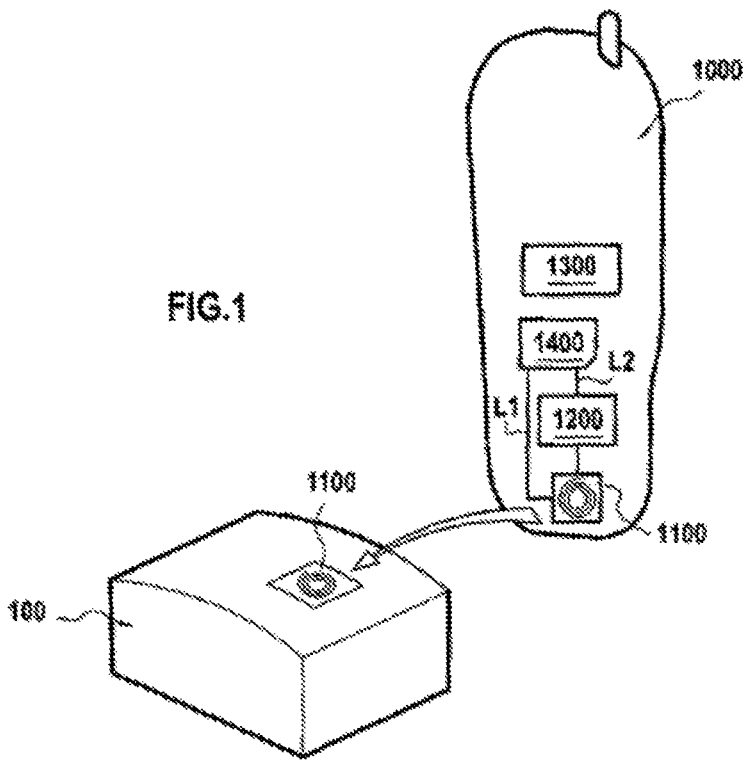
FIG. 1 shows an electronic device in accordance with the invention, in a particular embodiment.

FIG. 1 shows a selection device 1000 in accordance with a particular embodiment of the invention.

The selection device 1000 is a mobile telephone.

It includes a processor 1300 suitable for implementing the conventional operations of a mobile telephone, namely relating to telephony, sending and receiving messages, and operations of managing the man/machine interface.

In the embodiment described herein, the device 1000 has means for contactless communication with an external reader 100. These contactless communication means are constituted mainly by an antenna 1100 and by a microprocessor 1200 complying with the near field communication (NFC) standard or ISO 14443.

In the embodiment described herein, the mobile telephone 1000 includes a smart card (subscriber identity module (SIM) card) 1400 that is powered electrically by the antenna 1100 via a circuit L1.

In the embodiment described herein, the microprocessor 1200 performs analog-to-digital converter and modulator/demodulator functions for communicating via the antenna 1100. Such a microprocessor is commonly referred to as a contactless front end (CLF).

In the embodiment described herein, the SIM card 1400 communicates with the microprocessor 1200 via a connection L2 and in compliance with the single wire protocol (SWP).

Figure 2:
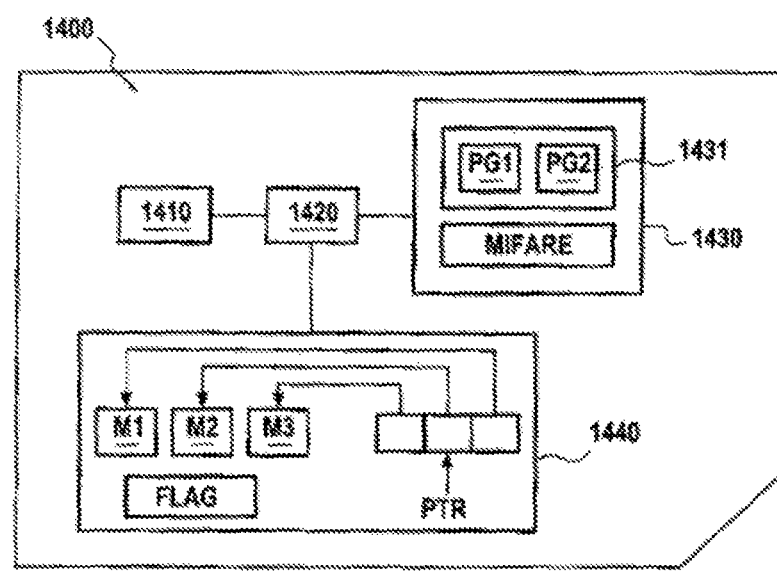
FIG. 2 shows a detail of the device.

FIG. 2 shows the SIM card 1400 of the mobile telephone 1000 in detail.

The SIM card, preferably in compliance with the ISO 7816 standard, comprises an input/output interface 1410, a ROM 1430, and a rewritable non-volatile memory of the electrically erasable programmable ROM (EEPROM) type 1440, these elements being connected by a bus to a microprocessor 1420.

In the embodiment described herein, the rewritable non-volatile EEPROM 1440 comprises:
 three memories M1, M2, M3, each constituting an application in the MIFARE technology meaning; and
 a pointer PTR pointing to the selected one of the memories M1 to M3 at a given instant.

In the embodiment described herein, the ROM 1430 has two computer programs in a memory unit 1431, namely:
 a first computer program PG1, which program includes in particular the operating system of the SIM card 1400, instructions for implementing ISO 14443-1 to 14443-3 protocols, and a module enabling a MIFARE application M1 to M3 to be selected; and
 a computer program PG2 suitable for implementing an application and for managing the sending and receiving of messages exchanged with the external entity 100 in the context of said MIFARE applications M1 to M3.

Figure 3A:
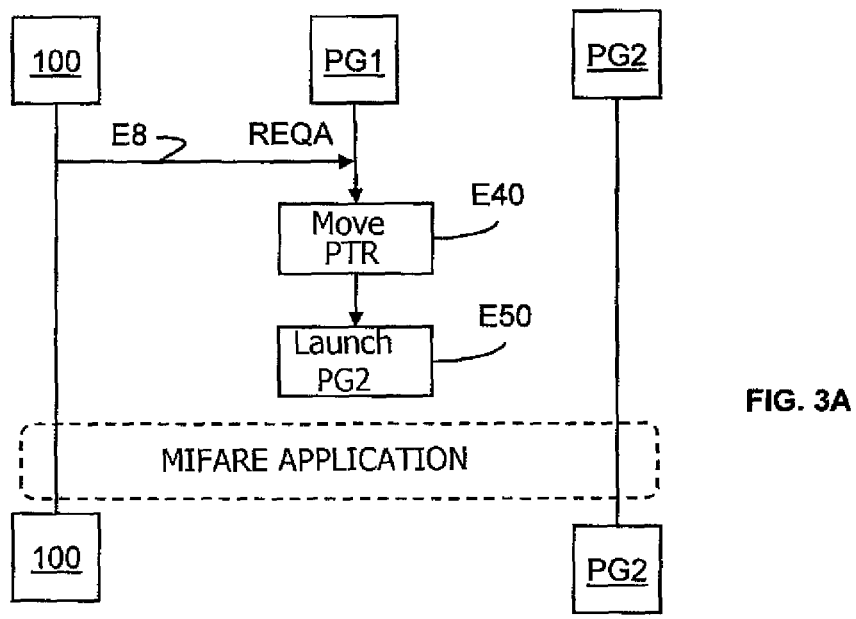
FIGS. 3A to 3D and FIG. 4 are flow charts showing selection methods in accordance with different implementations of the invention.

With reference to FIG. 3A, there follows a description of the main steps of a first selection method in accordance with the invention, the method being implemented by the mobile telephone 1000 described above with reference to FIGS. 1 and 2.

Initially, it is assumed that a user moves the mobile telephone 1000 to within a few centimeters of the reader 100 so that the antenna 1100 of the mobile telephone enters into the electromagnetic field generated by said reader.

The SIM card 1400 is thus powered by the circuit L1 or by the battery of the telephone. In the embodiment described herein, the first computer program PG1 is then implemented by the microprocessor 1420 of the SIM card.

It is assumed that the pointer PTR is initialized during a preliminary personalization stage so as to point to MIFARE application M1, for example.

It is assumed that the reader 100 sends a polling message REQA that is received by the module PG1 during a step E8.

The reception of this message constitutes an event in the meaning of the invention.

In the embodiment described herein, the program PG1 includes a step E40 of moving the pointer PTR sequentially so that it then points to MIFARE application M2.

The program PG1 then acts during a step E50 to launch the second computer program PG2 for managing the exchange of messages that are exchanged with the external unit 100 in the context of the MIFARE application M2.

Figure 3B:
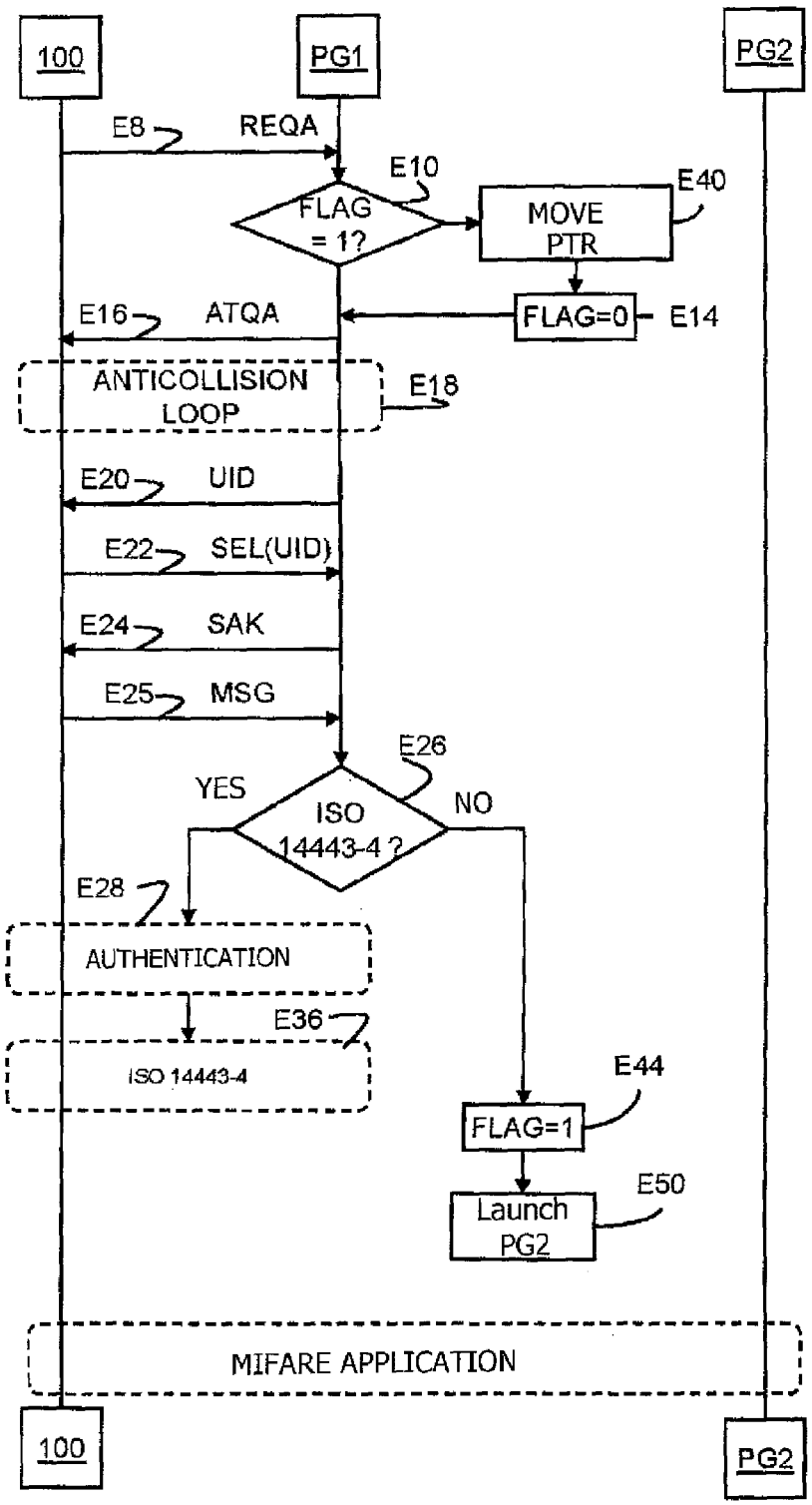

The steps of a second selection method in accordance with the invention are described with reference to FIG. 3B.

In this embodiment, the first computer program PG1 is suitable for implementing the ISO 14443-1 to 14443-4 standards.

In this embodiment, the non-volatile EEPROM 1440 includes a register suitable for storing the value of a flag FLAG that is initially set to 0.

In the embodiment described herein, the pointer PTR is initialized to point to the MIFARE memory M1.

In the embodiment described herein, when the first computer program PG1 receives the polling message REQA, it verifies during a step E10 whether or not the flag stored in the non-volatile EEPROM 1440 contains the predetermined value "1", or otherwise.

If it does have the value "1", then the pointer PTR is moved during a step E40 and the flag is set to the value "0" during a step E14.

In the example described herein, the flag is initialized with the value "0", such that on this first reception of the polling message REQA, the steps E12 and E14 are not implemented, since no event has thus been detected at this stage.

In accordance with the ISO 14443-1 to ISO 14443-3 protocol, the device 1000 in accordance with the invention responds to the request REQA by sending a message ATQA during a step E16.

Then, during a step E18, the reader 100 and the electronic device 1000 in accordance with the invention implement a general step E18 known to the person skilled in the art as an "anticollision loop" that enables the reader 100 to actually select the device 1000 of the invention from amongst other smart cards or devices that might be situated in the electromagnetic field of the reader 100.

At the end of this collision management stage, the device 1000 acts during a step E20 to send an identifier UID to the reader 100, which identifier identifies the device 1000 in unique manner.

In accordance with ISO 14443-1 to 14443-3 protocol, the reader 100 selects the device 1000 during a step E22 by sending a message SEL(UID), with the telephone 1000 acknowledging this selection by sending a select acknowledge (SAK) message.

These various messages (REQA, ATQA, anticollision loop, UID, SEL(UID), and SAK) are messages common to applications using the ISO 14443-4 protocol and to applications in compliance with MIFARE technology.

It is now assumed that during a step E25, the reader 100 sends a message MSG.

During a test E26, the first module PG1 verifies whether the message does or does not comply with the ISO 14443-4 protocol.

If it does comply, the result of the test E26 is positive.

The test is then followed by a mutual authentication procedure E28 that is implemented by the reader 100 and by the mobile telephone 1000, in accordance with the ISO 14443-4 protocol, and then by a general step E36 during which the telephone 1000 communicates with the reader 100 in accordance with the ISO 14443-4 protocol.

If, during the step E26, the first module PG1 detects that the message MSG received in step E25 is not in compliance with the ISO 14443-4 protocol, then the result of the test E26 is negative.

The test is then followed by a step E44 during which the first computer program PG1 sets the flag to have the value "1".

Thereafter, the first computer program PG1 launches the second computer program PG2 during a step E50.

A MIFARE transaction can then be implemented between the reader 100 and the MIFARE application M1 of the mobile telephone 1000.

Subsequently, when the mobile telephone 1000 receives a new polling message REQA (in step E8), the result of the test E10 on the value of the flag will be positive, such that the steps E12 (moving pointer PTR) and E14 (reinitializing the flag to the value "0") will be executed.

The telephone 1000 consequently selects the MIFARE application M2.

In this second embodiment, the reception of a message that cannot be interpreted by the first computer program PG1 constitutes an event in the meaning of the invention.

Figure 3C:
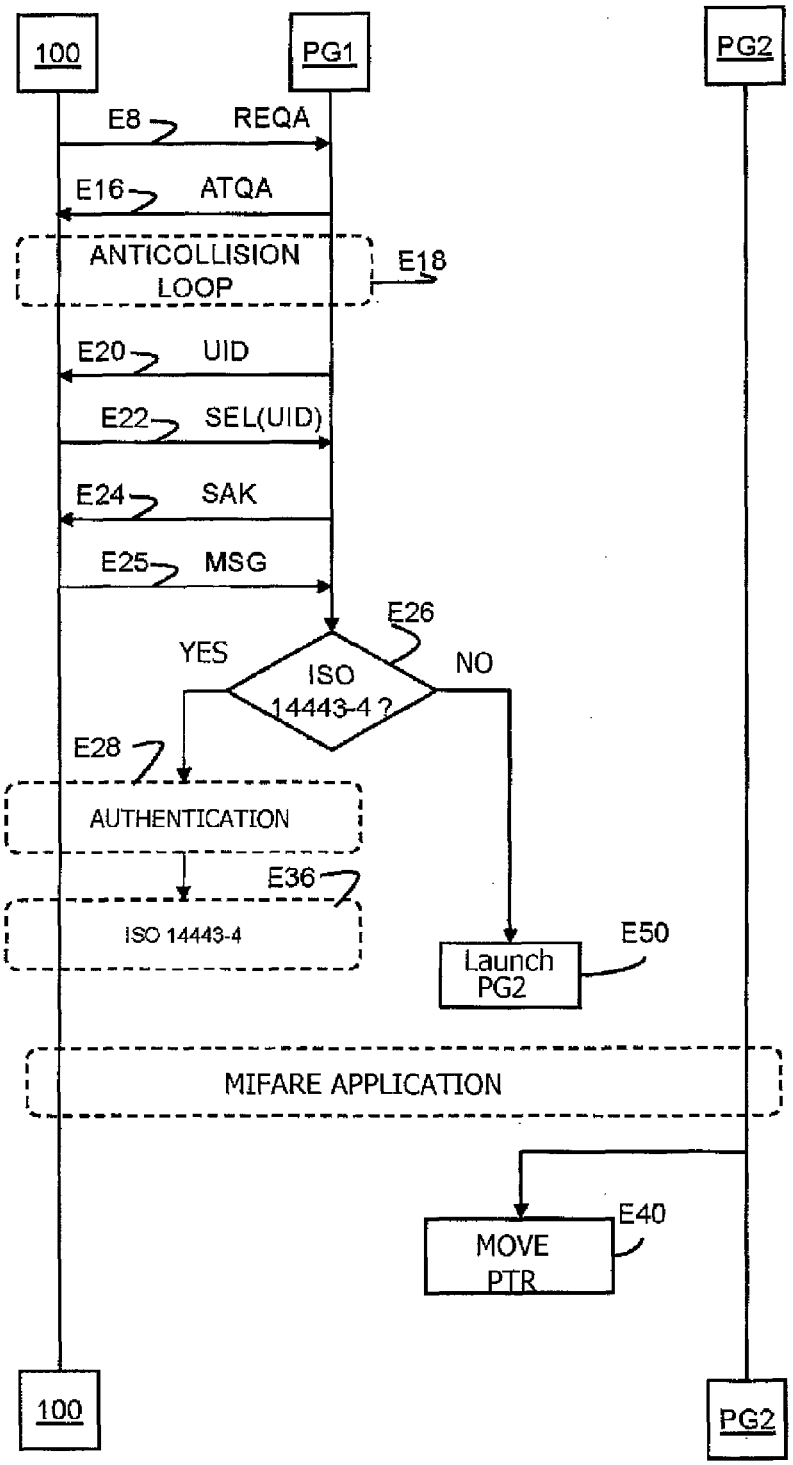

In the third embodiment as shown in FIG. 3C, the second computer program PG2 returns control to the first computer program PG1 after executing the MIFARE application and, in step E40, the pointer is moved after control has been returned in this way.

This embodiment avoids the use of a flag.

Figure 3D:
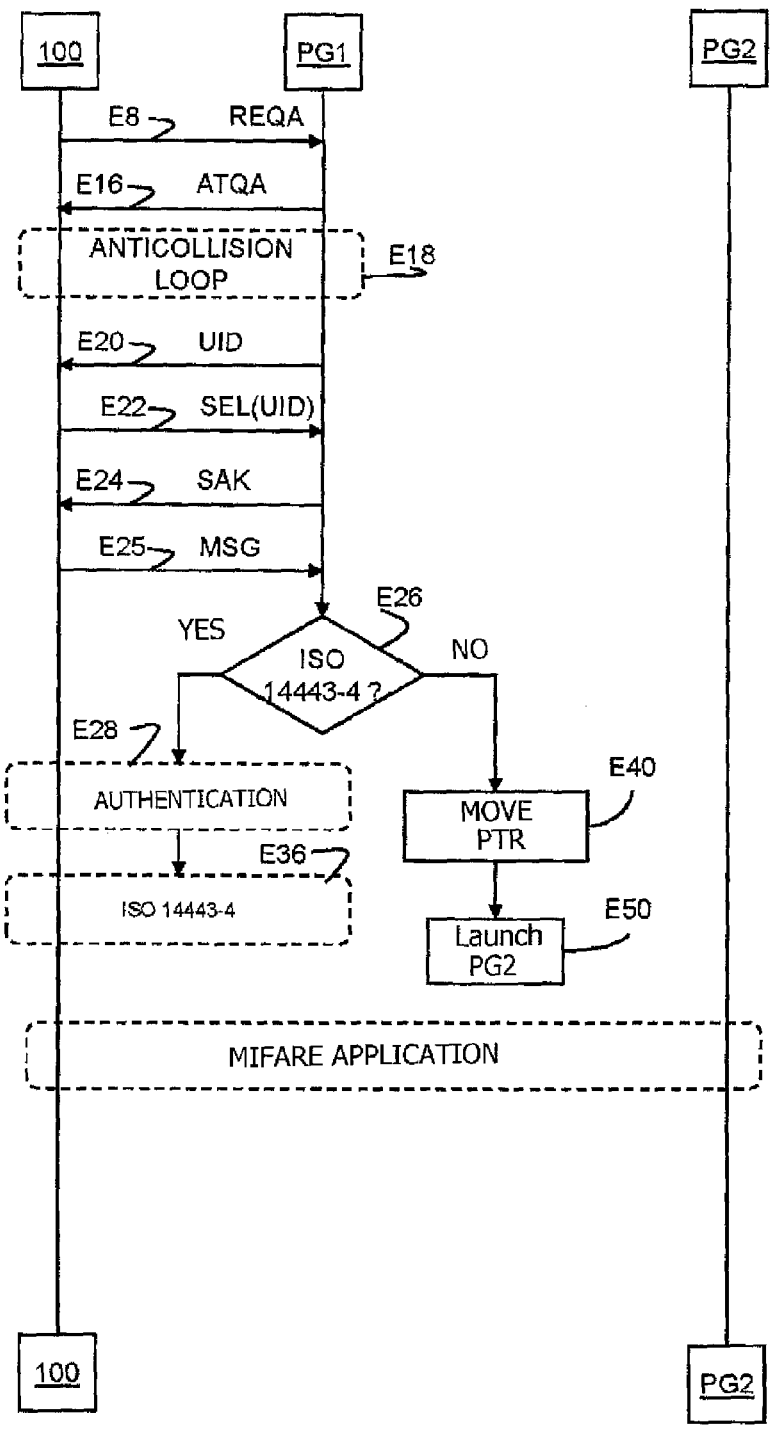

In the fourth embodiment shown in FIG. 3D, the first module PG1 moves the pointer PTR (step E40) after receiving a non-interpretable message, and immediately before launching execution of the second module PG2.

In the above-described embodiments, the pointer PTR is moved sequentially.

In a variant, it may be moved cyclically, or it may be selected randomly.

Figure 4:
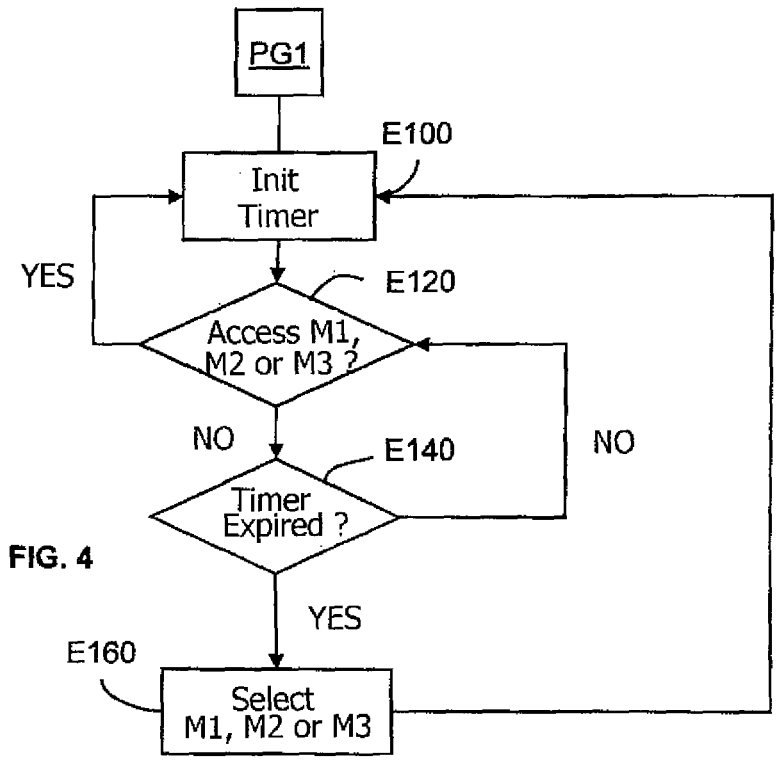

FIG. 4 shows a selection method in accordance with a second variant of the invention.

In this embodiment, the first computer program PG1 is suitable for detecting whether the second computer program PG2 is executing a MIFARE application by monitoring access to the memories M1 to M3.

In the embodiment described herein, the first computer program PG1 acts during a step E100 to initialize a timer with a predetermined duration.

As soon as an access occurs to one of the memories M1 to M3 (test E120 positive), it is assumed that a MIFARE application is in progress with the reader 100, and the timer is reinitialized with the same duration.

Otherwise, if no access to any of the memories M1 to M3 occurs during this duration (test E140 positive), it is assumed that there is no MIFARE application in progress (either that there has never been one or that it has terminated), and a MIFARE application is selected.

In most circumstances, the MIFARE application as selected in this way will be different from the present MIFARE application.

However, in one embodiment of the invention, the MIFARE application is selected randomly, and it can therefore happen that the same MIFARE application is selected several times in a row.

In all of the above-described embodiments (FIGS. 3A to 3D and FIG. 4), the rewritable non-volatile EEPROM 1440 has three distinct memories M1, M2, and M3.

In a variant, the rewritable non-volatile EEPROM 1440 has only one memory M, and on each change of MIFARE application, the content of the MIFARE application is copied into said memory M. In this variant, there is no need to a use a pointer PTR, since the current MIFARE application can be determined by comparing content of the memory M with each of the MIFARE applications.

In the above-described embodiments, the invention is implemented mainly in the smart card 1400 of the mobile telephone 1000.

In a variant, it could be implemented in the mobile telephone itself, with the computer programs PG1 and PG2 being executed by the processor 1300 of the telephone.

The invention may also be implemented in other types of electronic device, and in particular in a smart card provided with contactless communications means, in particular an antenna.

What is claimed is:

1. An electronic device comprising:
an antenna; and
a microprocessor, the antenna and microprocessor receiving messages transmitted by an external entity, the microprocessor implementing at least two applications communicating with said external entity using the same protocol, the microprocessor generating a predetermined event on receiving at least one particular message received through the antenna from said external entity or when communication is being initialized with said external entity, the microprocessor detecting said predetermined event and selecting, upon detection of said predetermined event, one application amongst said applications, the selected application being selected independently of any message received from said external entity, and independently of any interaction with a user of the electronic device, by using a pointer pointing to the selected application at a given time, said event detection triggering a movement of said pointer;
wherein the microprocessor executes a first computer module suitable for launching an execution of a second computer module, the second computer module being suitable for implementing said at least two applications; and
wherein said first computer module generates the predetermined event.

2. The electronic device of claim 1, wherein said first computer module generates the predetermined event on receiving a command that is interpretable by said first computer module.

3. The electronic device of claim 1, wherein said first computer module generates said predetermined event immediately after launching the execution of said second computer module.

4. The electronic device of claim 3, wherein said first computer module generates said predetermined event on receiving a command that is not interpretable by said computer first module.

5. The electronic device of claim 1, wherein said first computer module is suspended after the second computer module is launched and resumes execution after execution of said second computer module, said first computer module generating said predetermined event after said resumption of execution.

6. The electronic device of claim 1, wherein:
said first computer module is suitable for communicating with said external entity in application of ISO 14443-1 to ISO 14443-3 standards;
said at least two applications are MIFARE applications; and
said second computer module is suitable for implementing an application to generate the sending and receiving of messages exchanged with said external entity in a context of said MIFARE applications.

7. The electronic device of claim 1, wherein said microprocessor selects said application from amongst said at least two applications in sequential manner.

8. The electronic device of claim 1, wherein said at least two applications are MIFARE applications.

9. A selection method that can be implemented by an electronic device suitable for communicating with an external entity and for implementing at least two applications communicating with said external entity using the same protocol, the method comprising:
receiving messages transmitted by an external entity, implementing at least two applications communicating with said external entity using the same protocol,
generating a predetermined event on receiving at least one particular message received through an antenna from said external entity or when communication is being initialized with said external entity;
generating a predetermined event on reception of at least one particular message received through the antenna from said external entity or when communication is being initialized with said external entity;
detecting said predetermined event;
selecting, upon detection of said predetermined event, one application amongst said at least two applications, the selected application being selected independently of any message received from said external entity, and independently of any interaction with a user of the electronic device, by using a pointer pointing to the selected application at a given time, said event detection triggering a movement of said pointer; and executing a first computer module suitable for launching an execution of a second computer module, the second computer module being suitable for implementing said at least two applications, wherein said first computer module generates the predetermined event.

10. A computer program stored on a computer memory and executing on a processor which, when used on a computer apparatus causes the processor to execute the steps of the selection method of claim 9.

11. The selection method of claim 9, wherein said at least two applications are MIFARE applications.

12. A non-transitory recording medium readable by a computer and having recorded thereon a computer program including instructions for executing the steps of the selection method of claim 10.

13. An electronic device comprising:
   an antenna; and
   a microprocessor, the antenna and microprocessor receiving messages transmitted by an external entity, the microprocessor implementing at least two applications communicating with said external entity using the same protocol, the microprocessor generating a predetermined event on receiving at least one particular message received through the antenna from said external entity or when communication is being initialized with said external entity, the microprocessor detecting said predetermined event and selecting, upon detection of said predetermined event, one application amongst said applications, the selected application being selected independently of any message received from said external entity, by using a pointer pointing to the selected application at a given time, said event detection triggering a movement of said pointer;
   wherein the microprocessor executes a first computer module suitable for launching an execution of a second computer module, the second computer module being suitable for implementing said at least two applications; and
   wherein said first computer module generates the predetermined event.

14. The electronic device of claim 13, wherein said at least two applications are MIFARE applications.

15. The electronic device of claim 13, wherein the selected application is selected independently of any interaction with a user of the electronic device.

16. A selection method that can be implemented by an electronic device suitable for communicating with an external entity and for implementing at least two applications communicating with said external entity using the same protocol, the method comprising:
   receiving messages transmitted by an external entity, implementing at least two applications communicating with said external entity using the same protocol,
   generating a predetermined event on receiving at least one particular message received through an antenna from said external entity or when communication is being initialized with said external entity;
   generating a predetermined event on reception of at least one particular message received through the antenna for said external entity or when communication is being initialized with said external entity;
   detecting said predetermined event;
   selecting, upon detection of said predetermined event, one application amongst said at least two applications, the selected application being selected independently of any message received from said external entity, by using a pointer pointing to the selected application at a given time, said event detection triggering a movement of said pointer; and
   executing a first computer module suitable for launching an execution of a second computer module, the second computer module being suitable for implementing said at least two applications,
   wherein said first computer module generates the predetermined event.

17. The selection method of claim 16, wherein said at least two applications are MIFARE applications.

18. The selection method of claim 16, wherein the selected application is selected independently of any interaction with a user of the electronic device.

* * * * *